United States Patent [19]

Matsumoto

[11] Patent Number: 5,693,432
[45] Date of Patent: Dec. 2, 1997

[54] POROUS MATERIAL-POLYMERIC SOLID ELECTROLYTE COMPOSITE, METHOD FOR PRODUCING SAME AND PHOTOELECTRIC CONVERSION DEVICE USING SAME

[75] Inventor: Masamitsu Matsumoto, Kusatsu, Japan

[73] Assignee: Ishihara Sangyo Kaisha, Ltd., Osaka, Japan

[21] Appl. No.: 577,016

[22] Filed: Dec. 22, 1995

[30] Foreign Application Priority Data

| Dec. 29, 1994 | [JP] | Japan | 6-339453 |
| May 8, 1995 | [JP] | Japan | 7-135948 |
| Oct. 19, 1995 | [JP] | Japan | 7-296242 |

[51] Int. Cl.$^6$ ............................ H01M 6/16
[52] U.S. Cl. ............................ 429/192
[58] Field of Search ............ 429/191, 192, 429/193; 252/62.2

[56] References Cited

U.S. PATENT DOCUMENTS

| 4,927,721 | 5/1990 | Gratzel et al. | 429/111 |
| 5,084,365 | 1/1992 | Gratzel et al. | 429/111 |
| 5,393,620 | 2/1995 | Manaresi et al. | 429/192 |
| 5,433,876 | 7/1995 | Fauteux et al. | 252/62.2 |
| 5,433,877 | 7/1995 | Kono et al. | 252/62.2 |
| 5,436,090 | 7/1995 | Kono et al. | 424/11 |

FOREIGN PATENT DOCUMENTS

| 5-025353 | 2/1993 | Japan | 429/192 |
| 5-295058 | 11/1993 | Japan | |
| 91/16719 | 10/1991 | WIPO | 429/111 |
| 93/20559 | 10/1993 | WIPO | 429/111 |

OTHER PUBLICATIONS

NATURE, vol. 353 (1991) pp. 737–740.
Proceedings, Spring Meeting of Japan Chemical Society, 1992, No. 2F725.

*Primary Examiner*—M. Nuzzolillo
*Attorney, Agent, or Firm*—Cushman Darby & Cushman IP Group of Pillsbury Madison & Sutro LLP

[57] ABSTRACT

A porous material-polymeric solid electrolyte composite having a sufficient ionic conductivity and an excellent electrical connection is provided. This composite comprises a porous material and a polymeric solid electrolyte composed of at least a polymer compound and an electrolyte and being present in the pores of the porous material. Moreover, a method for producing the composite and photoelectric conversion devices using the composite are provided.

2 Claims, No Drawings

POROUS MATERIAL-POLYMERIC SOLID ELECTROLYTE COMPOSITE, METHOD FOR PRODUCING SAME AND PHOTOELECTRIC CONVERSION DEVICE USING SAME

BACKGROUND OF THE INVENTION

1. Field of the Invention

The present invention relates to a material which comprises a porous material and a polymeric solid electrolyte having ionic conductivity allowed to be present in the pores of the porous material (hereinafter referred to as "porous material-polymeric solid electrolyte composite" or merely as "composite"), a method for producing the composite, and a photoelectric conversion device in which the composite is used.

2. Description of Related Art

Recently, there is a fear of exhaustion of fossil fuel resources and, furthermore, there is a problem of increase in the concentration of carbon dioxide in air caused by use of fossil fuels. Under the circumstances, solar cells which are clean and cause no problem of exhaustion of resources have been increasingly expected. However, as for the conventionally studied solar cells which use silicon, a large amount of energy is required for producing starting silicon and, therefore, they suffer from the problems that not only the production cost is high, but also the period necessary to recover the energy required for the production, namely, a long energy pay-back time is taken. In order to solve the problem, researches on compound semiconductors such as cadmium telluride and copper indium diselenide have been intensively conducted.

One of them is the titanium oxide solar cell reported in "NATURE", Vol.353 (1991), pp 737–740. This technique uses as an electrode a titanium oxide porous thin film sensitized with a ruthenium complex, and this is low in cost and shows a high energy conversion efficiency because a large amount of the ruthenium complex can be supported on the thin film. However, since this is a liquid junction solar cell in which the electrical connection to a counter electrode is carried out with an electrolyte solution, there is a problem in long-term stability owing to the leakage of solution, and, furthermore, complication of production steps is brought about.

These problems can be solved by using solid electrolytes. The conventionally studied solid electrolytes include polymeric solid electrolytes. They comprise a polymer compound such as polyethylene oxide or polyphosphazene in which an alkali metal salt is dissolved. As disclosed in JP-A-5 25353, some attempts have been made to improve the mechanical strength or stability by introducing a crosslinked structure.

However, these polymeric solid electrolytes have been developed for applying mainly to lithium cells, etc. In this case, lithium ion acts for ionic conduction. When application to liquid junction solar cells is considered, it needs ionic conduction through an oxidation-reduction material such as an iodide-triiodide oxidation-reduction system. A polymeric solid electrolyte containing an oxidation-reduction system is disclosed in JP-A-5 295058 but, in this case, also lithium ion acts for ionic conduction and not the oxidation-reduction material.

Furthermore, as an example of applying a polymeric solid electrolyte to solar cells, there is the report of Wacom Chuken Co., Ltd., Proceedings of the Spring Meeting of the Chemical Society of Japan in 1992, lecture No.2F725. The polymeric solid electrolyte used in this case comprises a previously polymerized polymer compound which contains an oxidation-reduction system. It is produced by dissolving a polymer compound in a solvent and then dissolving an oxidation-reduction system therein, but it is difficult to sufficiently impregnate a film having fine pores such as a titanium oxide porous body owing to bulkiness of molecules, and when a porous film is used as an electrode, it is difficult to obtain a sufficient electric connection.

SUMMARY OF THE INVENTION

An object of the present invention is to provide a composite having a sufficient ionic conductivity and excellent in electrical connection. Another object of the present invention is to provide a method for simply and easily producing the composite. Further another object of the present invention is to provide a photoelectric conversion device using the composite, for solar cells, etc.

DETAILED DESCRIPTION OF PREFERRED EMBODIMENTS

The inventor has conducted research in an attempt to obtain polymeric solid electrolytes having a sufficient ionic conductivity and excellent electrical connection even in a porous material. As a result, it has been found that (1) a desired porous material-polymeric solid electrolyte can be obtained by allowing a polymeric solid electrolyte comprising at least a polymer compound and an electrolyte as constituents to be present in the pores of a porous material, (2) a preferred method for producing said composite comprises impregnating the porous material with a mixture containing a monomer and an electrolyte and then polymerizing the monomer to allow the polymeric solid electrolyte to be present in the pores of the porous material, and (3) the composite is useful as a photoelectric conversion device for solar cells, etc. Thus, the present invention has been accomplished.

First, the present invention relates to a composite which comprises a porous material and a polymeric solid electrolyte comprising at least a polymer compound and an electrolyte as constituents, said polymeric solid electrolyte being present in the pores of the porous material. When a polymeric solid electrolyte is allowed to be present in the pores of a porous material, the polymeric solid electrolyte can be intimately and firmly bonded to the porous material and can give an excellent electrical connection. In the present invention, the porous material is a solid, a solid film or a solid film fixed on a support, said solid or solid film comprising a metal or an inorganic compound such as a metal oxide, a metal nitride, a metal sulfide or the like and having fine pores. That is, the porous material has a large specific surface area, and when the porous material is a solid, it has a specific surface area of 1 $m^2/g$ or larger and when the porous material is a solid film, it has a specific surface area of 10 $m^2$ or larger, preferably about 100–10000 $m^2$ per $m^2$ of the solid film. More specifically, titanium oxide, zirconium oxide, zinc oxide, tin oxide, barium titanate, titanium nitride, cadmium sulfide, cadmium selenide, indium copper diselenide, cadmium telluride, etc. are used, but these are not limitative. Furthermore, the porous materials in the present invention may be coated or modified with organic compounds such as sensitizing dyes, inorganic pigments, semiconductors, etc. In the present invention, the porous materials are preferably those which are mainly composed of titanium oxide having good photosemiconductor properties.

The polymeric solid electrolyte in the present invention comprises at least a polymer compound and an electrolyte. As the polymer compound, there may be used those which per se dissolve the electrolyte to exhibit an ionic conductivity or those which per se cannot dissolve the electrolyte, but exhibit an ionic conductivity with use of a solvent capable of dissolving the electrolyte. Examples of the former polymer compounds are polyethylene glycol, and polymer compounds having in the main chain thereof a structure such as polyacrylic acid, polymethacrylic acid, polyethylene oxide, polypropylene oxide, polyvinyl alcohol, polyphosphazene or polysilane and having a polyoxyethylene structure in the side chain. Even in the case of these polymer compounds capable of dissolving the electrolyte, it is preferred to use in combination the solvents capable of dissolving the electrolyte as mentioned hereinafter. Examples of the latter polymer compounds are polyvinyl chloride, polyacrylonitrile, polyethylene, polypropylene, polyester and polyacrylate.

In the present invention, the polymer compounds are preferably those which have a crosslinked structure. As for the polymer compounds having no crosslinked structure, if they contain a molecule having a high water absorption, such as an alkali metal salt, they absorb water in air and the whole polymers are apt to lose the mechanical strength. Furthermore, when an organic solvent is introduced as a plasticizer in order to improve the ionic conductivity, they are also apt to lose the mechanical strength. On the other hand, the polymer compounds having a crosslinked structure are in a so-called gel state, and even when they have molecules of water or plasticizers such as organic solvents in their molecule, these are confined in the network and the compounds are excellent in mechanical strength. In the present invention, the polymer compounds having the crosslinked structure are those which have a network formed by crosslinking in the whole polymer. In the present invention, the polymeric solid electrolytes containing the polymer compounds having the crosslinked structure are called a crosslinked type polymeric solid electrolyte. In order to allow the polymer compounds to have the crosslinked structure, a crosslinking agent having a polyfunctional group, such as glycerin, methylenebisacrylamide, oligoethylene glycol diacrylate, and an alkyl diacrylate is generally used. As the polymer compounds, there may be used those having in the main chain thereof a structure such as polyacrylic acid, polymethacrylic acid, polyethylene oxide, polypropylene oxide, polyvinyl alcohol, polyphosphazene or polysilane and having a polyoxyethylene structure in the side chain thereof and, in addition, there may be used polyvinyl chloride, polyacrylonitrile, polyethylene, polypropylene, polyester, and polyacrylate. The present invention is not limited to these compounds. In the present invention, the polymer compounds are preferably those which have a polyoxyethylene structure in the main chain or side chain thereof. Especially preferred are polymer compounds obtained by polymerizing at least one monomer represented by the following formula (I) because of their superior ionic conductivity.

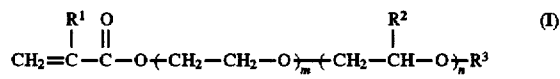

wherein $R^1$, $R^2$ and $R^3$ each represent a hydrogen atom or a lower alkyl group of one or more carbon atoms, m is an integer of 1 or more, n is an integer of 0 or more, and n/m is 0–5.

In the present invention, various compounds can be used as the electrolytes, and oxidation-reduction systems are especially preferred. The oxidation-reduction systems in the present invention mean a pair of materials which are present reversibly in the state of an oxidation type and in the state of reduction type in oxidation-reduction reaction. Examples are an iodine-iodide oxidation-reduction system comprising combinations of $I_2$ and a metal iodide such as LiI, NaI, KI, CsI and $CaI_2$, $I_2$ and an iodide of quaternary ammonium such as tetraalkylammonium iodide and pyridinium iodide or polymer compounds having them in the side chain; a bromine-bromide oxidation-reduction system comprising a combination of $Br_2$ and a metal bromide such as LiBr, NaBr, KBr, CsBr and $CaBr_2$, $Br_2$ and a bromide of quaternary ammonium such as tetraalkylammonium bromide and pyridinium bromide or polymer compounds having them in the side chain thereof; metal complexes such as ferrocyanate-ferricyanate and ferrocene-ferricinium ion; sulfur compounds such as sodium polysulfide and alkylthiol-alkyl disulfide; viologen dyes; hydroquinone-quinone, etc. Preferred are a pair of materials comprising iodine and an iodide or bromine and a bromide.

The proportion of the electrolyte to be mixed with the polymer compound can be optionally chosen within the limit of the solubility of the electrolyte in the polymer compound. In general, with increase in the amount of the electrolyte, polymeric solid electrolytes of higher ionic conductivity can be obtained, but when the amount is too large, sometimes the conductivity rather decreases because a pseudo-crosslinking phenomenon of a polymer network is caused by the electrolyte. Furthermore, when equilibrium potential of the oxidation-reduction system is important, the amount of the electrolyte to be mixed can be adjusted so as to obtain the desired equilibrium potential.

In the present invention, when a solvent capable of dissolving the electrolyte is present in the polymeric solid electrolyte, the ion mobility and effective carrier concentration of the polymeric solid electrolyte are improved and, as a result, a polymeric solid electrolyte having an excellent ionic conductivity can be obtained. The solvents capable of dissolving the electrolyte in the present invention include, for example, carbonate compounds such as ethylene carbonate, propylene carbonate and N-methyloxazolinone, ether compounds such as dioxane and diethyl ether, chain ethers such as ethylene glycol dialkyl ether, propylene glycol dialkyl ether, polyethylene glycol dialkyl ether and polypropylene glycol dialkyl ether, alcohols such as methanol, ethanol, ethylene glycol monoalkyl ether, proylene glycol monoalkyl ether, polyethylene glycol monoalkyl ether and polypropylene glycol monoalkyl ether, polyhydric alcohols such as ethylene glycol, propylene glycol, polyethylene glycol, polypropylene glycol and glycerin, nitrile compounds such as acetonitrile, propionitrile and benzonitrile, non-protonic polar materials such as dimethyl sulfoxide and sulfolane, and water. However, the present invention is not limited to these solvents. The mixing ratio of the polymer compound and the solvent capable of dissolving the electrolyte may be optionally set in weight ratio, but preferably the solvent is used in an amount of 0.5–10 times the weight of the polymer compound.

The method for producing the composite according to the present invention preferably comprises impregnating a porous material with a mixture containing a monomer and an electrolyte and, then, polymerizing the monomer to allow a polymeric solid electrolyte to be present in the pores of the porous material. When an oxidation-reduction system is used as the electrolyte, one component of the oxidation-reduction system, especially, the compound in reduction state sometimes acts as a polymerization inhibitor to hinder the polymerization of the monomer. Therefore, a preferred method of the present invention comprises impregnating the porous material with the monomer and one component of the oxidation-reduction system, then, polymerizing the monomer by a suitable process, and, thereafter, absorbing another component of the oxidation-reduction system in the polymer to allow a polymeric solid electrolyte to be present in the pores of the porous material. For example, iodine and an iodide are used as the oxidation-reduction system, since iodine acts as a radical polymerization inhibitor, first the porous material is impregnated with a mixture containing the iodide and the monomer and then, the monomer mixture is polymerized. When the thus obtained product is placed together with iodine in a closed vessel, the iodine which diffuses in the vessel is absorbed in the polymer compound and forms an oxidation-reduction system with the previously mixed iodide, whereby the composite of the present invention can be produced. Furthermore, when the composite of the present invention is applied to a photoelectric conversion device, it is also possible to support another component of the oxidation-reduction system on a counter electrode constituting the photoelectric conversion device by a process such as coating, vapor deposition or the like. The polymerization of the monomer in the present invention can be performed by a thermal polymerization process, photopolymerization process, electrochemical polymerization process, electron radiation polymerization process, etc., and these are not limitative.

Moreover, when as the polymer compounds obtained by polymerizing monomers, those which are obtained by polymerizing at least one monomer represented by the above-mentioned formula (I) are used, crosslinked type polymeric solid electrolytes having superior ionic conductivity can be obtained. Furthermore, a preferred process in the present invention comprises allowing a solvent capable of dissolving the electrolyte to be present in a mixture of an electrolyte and a monomer and, thereafter, polymerizing the monomer.

Next, the present invention relates to a photoelectric conversion device. The photoelectric conversion device in the present invention is a device which converts the radiant energy into electrical energy by utilizing the electrochemical reaction between electrodes. For example, the photoelectric conversion device of the present invention used for solar cells, etc. comprises the composite as one of the electrodes and a counter electrode. When this photoelectric conversion device is irradiated with a light, electrons are generated from the electrode of the composite and move to the counter electrode through an electric lead wire provided between the electrodes. The electrons which have moved to the counter electrode reduce the electrolyte in the polymeric solid electrolyte. The reduced electrolyte moves as ion through the polymeric solid electrolyte and returns to the original electrode and it per se restores to an oxidant, thereby to return the electrons to the electrode of the composite. In this way, the photoelectric conversion device of the present invention can convert the radiant energy to electrical energy.

When the composite of the present invention, especially, the composite having the crosslinked type polymeric solid electrolyte is used for photoelectric conversion devices, since the composite is excellent in ionic conductivity and superior in electric connection, photoelectric conversion devices having a good conversion efficiency like the photoelectric conversion devices where an electrolyte solution is used can be obtained. Furthermore, since the electrolyte is solid, there is no fear of leakage of electrolyte solution and the long-term stability is improved.

The following nonlimiting examples will illustrate the present invention.

EXAMPLE 1

500 mg of lithium iodide was dissolved in a mixed solution containing 1 g of hexaethylene glycol methacrylate ester (BLENMER PE-350 manufactured by NOF Corporation) as a monomer, 1 g of ethylene glycol as a solvent capable of dissolving the electrolyte and 20 mg of 2-hydroxy-2-methyl-1-phenyl-propan-1-one (DAROCURE 1173 manufactured by Ciba-Geigy Japan Ltd.) as a polymerization initiator, and the solution was subjected to vacuum degassing for 10 minutes to expel the dissolved gas. Then, the solution was coated on a porous material. The porous material used was prepared by coating a suspension of titanium oxide on a transparent electrically conductive glass, sintering the coated glass to form a titanium oxide porous thin film having a surface area of 1000 $m^2$ per $m^2$ and adsorbing ruthenium-bipyridine complex represented by Ru (II) (2,2'-bipyridine-4,4'-dicarboxylic acid)$_2$ (isothiocyanic acid)$_2$ as a sensitizing dye to the resulting titanium oxide thin film in an amount of 40 μg per $cm^2$ of the titanium oxide thin film. Then, the porous material coated with the mixed solution was placed under reduced pressure to remove gas bubbles in the porous material and accelerate penetration of the monomer, and, thereafter, the monomer was polymerized by irradiation with ultraviolet rays to allow a homogeneous gel of the polymer compound to be present in the pores of the porous material. The thus obtained material was exposed to an iodine atmosphere for 30 minutes to diffuse iodine in the polymer compound to obtain a composite of the present invention which had the crosslinked type polymeric solid electrolyte. Thereafter, a transparent electrically conductive glass as a counter electrode was press bonded onto the composite, and the side faces were sealed with a resin, followed by providing a lead wire to obtain a photoelectric conversion device of the present invention.

The photoelectric conversion device was irradiated with a light of 1000 W/$m^2$ using a solar simulator of AM 1.5 as a light source, and current-voltage characteristics were measured. The characteristics of the photoelectric conversion device of the present invention were an open circuit voltage of 0.4V, a short circuit current of 2.5 mA/$cm^2$, a fill factor of 0.6, and a conversion efficiency of 0.5%.

EXAMPLE 2

A composite and a photoelectric conversion device of the present invention were obtained in the same manner as in Example 1, except that 2 g of propionitrile was used in place of 1 g of ethylene glycol. This photoelectric conversion device was irradiated with a light of 100 W/$m^2$ using a solar simulator of AM 1.5 as a light source, and current-voltage characteristics were measured. The characteristics of the photoelectric conversion device of the present invention were an open circuit voltage of 0.56V, a short circuit current of 0.178 mA/$cm^2$, a fill factor of 0.71, and a conversion efficiency of 0.71%.

EXAMPLE 3

A composite and a photoelectric conversion device of the present invention were obtained in the same manner as in Example 1, except that 2 g of propylene carbonate was used in place of 1 g of ethylene glycol and 400 mg of tetrapropylammonium iodide was used in place of 500 mg of lithium iodide. This photoelectric conversion device was irradiated with a light of 100 W/$m^2$ using a solar simulator of AM 1.5 as a light source, and current-voltage characteristics were measured. The characteristics of the photoelectric conversion device of the present invention were an open circuit voltage of 0.44V, a short circuit current of 0.36 mA/cm², a fill factor of 0.68, and a conversion efficiency of 1.1%. Moreover, this photoelectric conversion device was irradiated with a light of 1000 W/m² using a solar simulator of AM 1.5 as a light source, and current-voltage characteristics were measured. As a result, the open circuit voltage was 0.49V, the short circuit current was 3.5 mA/cm², the fill factor was 0.55, and the conversion efficiency was 0.95%.

EXAMPLE 4

A composite and a photoelectric conversion device of the present invention were obtained in the same manner as in Example 1, except that 2.5 g of propylene carbonate was used in place of 1 g of ethylene glycol. This photoelectric conversion device was irradiated with a light of 100 W/m² using a solar simulator of AM 1.5 as a light source, and current-voltage characteristics were measured. The characteristics of the photoelectric conversion device of the present invention were an open circuit voltage of 0.50V, a short circuit current of 0.32 mA/cm², a fill factor of 0.71, and a conversion efficiency of 1.1%.

EXAMPLE 5

A composite and a photoelectric conversion device of the present invention were obtained in the same manner as in Example 1, except that 3 g of propylene carbonate was used in place of 1 g of ethylene glycol in the monomer mixed solution and 100 mg of tetraethylene glycol diacrylate was added as a crosslinking agent. This photoelectric conversion device was irradiated with a light of 100 W/m² using a solar simulator of AM 1.5 as a light source, and current-voltage characteristics were measured. The characteristics of the photoelectric conversion device of the present invention were an open circuit voltage of 0.43V, a short circuit current of 0.23 mA/cm², a fill factor of 0.69, and a conversion efficiency of 0.69%.

EXAMPLE 6

500 mg of lithium iodide was dissolved in a mixed solution containing 1 g of hexaethylene glycol methacrylate ester (BLENMER PE-350 manufactured by NOF Corporation) as a monomer, 2 g of propylene carbonate as a solvent capable of dissolving the electrolyte and 20 mg of 2-hydroxy-2-methyl-1-phenyl-propan-1-one (DAROCURE 1173 manufactured by Ciba-Geigy Japan Ltd.) as a polymerization initiator, and the solution was subjected to vacuum degassing for 10 minutes to expel the dissolved gas. Then, the solution was coated on a porous material. The porous material used was a titanium oxide thin film to which sensitizing dye was adsorbed and was the same as used in Example 1. Then, the porous material coated with the mixed solution was placed under reduced pressure to remove gas bubbles in the porous material and accelerate penetration of the monomer, and, thereafter, the monomer was polymerized by irradiation with ultraviolet rays to allow a homogeneous gel of the polymer compound to be present in the pores of the porous material.

The another component, iodine, of the oxidation-reduction system was dissolved in 5 ml of methylene chloride together with 1 g of poly(hexaethylene glycol methacrylate) obtained by radical polymerization in a solvent. The resulting solution was coated on a transparent electrically conductive glass and dried. This was used as a counter electrode.

The thus obtained counter electrode was press bonded onto the composite, and the side faces were sealed with a resin, followed by providing a lead wire to obtain a photoelectric conversion device of the present invention. This photoelectric conversion device was irradiated with a light of 100 W/m² using a solar simulator of AM 1.5 as a light source, and current-voltage characteristics were measured. The characteristics of the photoelectric conversion device of the present invention were an open circuit voltage of 0.42V, a short circuit current of 0.20 mA/cm², a fill factor of 0.74, and a conversion efficiency of 0.64%.

COMPARATIVE EXAMPLE 1

In 5 ml of methanol were dissolved 100 mg of poly(hexaethylene glycol methacrylate) having no crosslinked structure obtained by radical polymerization in a solvent as a polymer compound and 500 mg of lithium iodide and 100 mg of iodine as an oxidation-reduction system. The solution was coated on the same titanium oxide electrode as used in Example 1 and dried at room temperature for 2 hours under reduced pressure. Then, a transparent electrically conductive glass as a counter electrode was press bonded onto the above titanium oxide electrode, and the side faces were sealed with a resin. Thereafter, a lead wire was provided to obtain a photoelectric conversion device. This photoelectric conversion device was irradiated with a light of 1000 W/m² using a solar simulator of AM 1.5 as a light source, and current-voltage characteristics were measured. As a result, the open circuit voltage was 0.27V, the short circuit current was 0.8 mA/cm², the fill factor was 0.55, and the conversion efficiency was 0.12%. Moreover, this photoelectric conversion device was irradiated with a light of 100 W/m² using a solar simulator of AM 1.5 as a light source, and current-voltage characteristics were measured. As a result, the open circuit voltage was 0.24V, the short circuit current was 0.09 mA/cm², the fill factor was 0.58, and the conversion efficiency was 0.15%.

COMPARATIVE EXAMPLE 2

This example shows an example of using a porous material and an electrolyte solution. A transparent electrically conductive glass as a counter electrode was press bonded onto the same titanium oxide electrode as used in Example 1, and, then, the side faces were sealed with a resin. Thereafter, an electrolyte solution prepared by dissolving 5.7 g of tetrapropylammonium iodide and 0.6 g of iodine were dissolved in a mixed solution comprising 8 ml of acetonitrile and 32 ml of ethylene carbonate was filled and the filling opening was sealed with a resin. Then, a lead wire was provided to obtain a photoelectric conversion device. This photoelectric conversion device was irradiated with a light of 1000 W/m² using a solar simulator of AM 1.5 as a light source, and current-voltage characteristics were measured. The open circuit voltage was 0.5V, the short circuit current was 7 mA/cm², the fill factor was 0.58, and the conversion efficiency was 2%.

From the above results, it can be seen that the composites of the present invention were higher in open circuit voltage and increased in short circuit current as compared with that of Comparative Example 1. This is because the polymeric solid electrolyte is present in the pores of the titanium oxide porous film in the composites of the present invention while in the composite of Comparative Example 1, the polymeric solid electrolyte does not sufficiently penetrate into the pores of the titanium oxide porous film owing to the high bulkiness of the polymer compound molecule. Furthermore, it can be seen that the composites of the present invention have a sufficient ionic conductivity and a direct current can be continuously flowed as compared with the case when a porous material and an electrolyte solution are used. Moreover, the composites of the photoelectric conversion device of the present invention can be simply produced, and there is no possibility of leakage of solution, and, in addition, they are excellent in mechanical strength.

The present invention is a composite comprising a porous material and a polymeric solid electrolyte composed of at least a polymer compound and an electrolyte as constituents which is present in the pores of the porous material. Since the composite does not need the electrolyte solution, it is high in mechanical strength and there is no fear of leakage of solution. Therefore, the composite has a high long-term stability and reliability and can be applied to photoelectric conversion devices and cell elements. Furthermore, the present invention is a composite in which the electrolyte is an oxidation-reduction system and which has an excellent ionic conductivity and is superior in electrical connection, and, therefore, it can be applied to photoelectric conversion devices which require an efficient ion transportation. Furthermore, the present invention is a composite where a solvent capable of dissolving electrolyte is present, and this is a preferred embodiment in which the composite is improved in ion mobility and effective carrier concentration, and the ionic conductivity is further improved. Further preferred embodiments include use of a pair of materials comprising iodine and iodide or bromine and bromide as the oxidation-reduction system, use of a polymer compound obtained by polymerizing at least one monomer represented by the formula (I) referred to hereinbefore, and use of a porous material mainly composed of titanium oxide.

Next, the present invention concerns with a method for producing the above-mentioned composite, and the composite of the present invention can be simply and efficiently produced by impregnating a mixture comprising a monomer and an electrolyte into a porous material and, then, polymerizing the monomer to cause the resulting polymeric solid electrolyte to be present in the pores of the porous material. Furthermore, the composite of the present invention can also be simply and efficiently produced by impregnating a mixture comprising one component of an oxidation-reduction system and a monomer into a porous material, then, polymerizing the monomer, and, thereafter, absorbing another component of the oxidation-reduction system. Moreover, a preferred embodiment is to use at least one monomer represented by the formula (I) as the monomer, whereby a more excellent composite of the present invention can be obtained.

The present invention further relates to a photoelectric conversion device, characterized in that the composite mentioned above is used, and since this photoelectric conversion device does does not need the electrolyte solution, it is high in mechanical strength and there is no fear of leakage of solution. Therefore, the photoelectric conversion device has a high long-term stability and reliability and is applicable to solar cells, etc. The photoelectric conversion device of the present invention has a good photoelectric conversion efficiency like ones which use a porous material and an electrolyte solution and, in addition, can avoid the troublesome producing steps of filling of electrolyte solution and sealing the filling opening and the conversion device can be simply and efficiently produced. Furthermore, since the photoelectric conversion device of the present invention does not use the electrolyte solution, restriction in design of the conversion device can be reduced and photoelectric conversion devices of free shapes can be produced.

What is claimed is:

1. A porous material polymeric solid electrolyte composite for a photoelectric conversion device, the pores of said porous material containing said polymeric solid electrolyte composed of at least a polymer compound and an electrolyte as constituting components, said porous material comprising titanium oxide in a film form, the titanium oxide film having a specific surface are of 100–10,000 m$^2$/m$^2$, said polymer compound obtained by polymerizing at least one monomer represented by the general formula (I) of

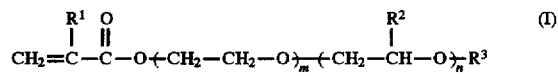

wherein R$^1$, R$^2$ and R$^3$ each represents a hydrogen atom or a lower alkyl group of one or more carbon atoms, m is an integer of 1 or more, n is an integer of 0 or more and n/m is in the range of 0–5, and said electrolyte being of an oxidation-reduction system of a pair of iodine and an iodide or of bromine and a bromide.

2. The porous material polymeric solid electrolyte composite according to claim 1, wherein the porous film is coated or modified with a sensitizing dye.

* * * * *